United States Patent
Allen

(10) Patent No.: US 10,177,546 B2
(45) Date of Patent: Jan. 8, 2019

(54) CONDUIT DIVIDER IN THE FORM OF A CABLE WITH FABRIC SLEEVE

(71) Applicant: Jerry L. Allen, Centennial, WY (US)

(72) Inventor: Jerry L. Allen, Centennial, WY (US)

(73) Assignee: WESCO Distribution, Inc., Pittsburgh, PA (US)

( * ) Notice: Subject to any disclaimer, the term of this patent is extended or adjusted under 35 U.S.C. 154(b) by 323 days.

(21) Appl. No.: 13/735,291

(22) Filed: Jan. 7, 2013

(65) Prior Publication Data

US 2013/0117993 A1    May 16, 2013

Related U.S. Application Data

(63) Continuation-in-part of application No. 12/455,356, filed on Jun. 2, 2009, now Pat. No. 9,054,507.

(60) Provisional application No. 61/132,698, filed on Jun. 23, 2008.

(51) Int. Cl.
 *H02G 1/08* (2006.01)
 *H01B 17/00* (2006.01)
 *H02G 9/06* (2006.01)
 *H02G 3/04* (2006.01)

(52) U.S. Cl.
 CPC .............. *H02G 1/08* (2013.01); *H01B 17/00* (2013.01); *H02G 9/065* (2013.01); *H02G 3/0481* (2013.01); *Y10T 29/49826* (2015.01); *Y10T 29/532* (2015.01)

(58) Field of Classification Search
 CPC .................................. H02G 1/08; H02G 1/081
 USPC .................................... 156/213; 254/143 FT
 See application file for complete search history.

(56) References Cited

U.S. PATENT DOCUMENTS

| 4,096,346 A * | 6/1978 | Stine et al. ............... 174/36 |
| 4,281,211 A * | 7/1981 | Tatum .................... H01B 7/083 174/117 F |
| 4,793,594 A * | 12/1988 | Kumpf ..................... H02G 1/08 254/134.3 FT |
| 6,188,026 B1 * | 2/2001 | Cope ..................... H01B 7/1885 174/120 C |
| 6,370,753 B1 * | 4/2002 | Washburn ............ G02B 6/4463 254/134.3 R |
| 6,433,273 B1 * | 8/2002 | Kenyon .................... B32B 5/02 174/110 R |
| 7,046,898 B2 * | 5/2006 | McLarty, III ........ G02B 6/4459 385/134 |
| 9,054,507 B2 * | 6/2015 | Allen ...................... H02G 1/08 |
| 2002/0170728 A1 * | 11/2002 | Holland ................ H02G 15/18 174/19 |

* cited by examiner

*Primary Examiner* — Michael N Orlando
*Assistant Examiner* — Marta S Dulko
(74) *Attorney, Agent, or Firm* — Renner, Kenner, Greive, Bobak, Taylor & Weber

(57) ABSTRACT

A communications cable (11) is provided with a pliant sleeve (12, 21, 31) to allow it to be more easily inserted into a conduit (50). One form of the sleeve (12) has hook (14) and loop (15) connected to each other so that the sleeve (12) can engage the cable (11). Another form of the sleeve (21) is spring-loaded to engage the cable (11). In a third form of the sleeve (31) has an adhesive (33) which attaches the sleeve (31) to the cable (11). Whatever form the sleeve cable takes, when in the conduit (50), the conduit (50) is divided for the ease of insertion of a second sleeved cable and it is not necessary to install a separate conduit divider into the conduit.

9 Claims, 3 Drawing Sheets

CONDUIT DIVIDER IN THE FORM OF A CABLE WITH FABRIC SLEEVE

CROSS-REFERENCE TO RELATED APPLICATION

This application is a continuation-in-part of U.S. application Ser. No. 12/455,356 filed on Jun. 2, 2009 which claimed priority of provisional U.S. Application No. 61/132,698 filed Jun. 23, 2008, which is incorporated herein by reference.

TECHNICAL FIELD

This invention relates to a communications cable which is provided with a fabric sleeve installed on the cable at the factory or in the field just before the cable is installed into a conduit. Such a sleeve effectively divides the conduit so that conventional conduit dividers into which cables are inserted are not needed.

BACKGROUND ART

Positioning cables in underground communication conduits which extend for several thousand feet has long been a problem. Such is particularly true when it is desired to position an additional cable or cables into a conduit that already has a cable in it. That cable, particularly because of its plastic jacket, provides a great deal of friction to the new cable as it is attempted to be inserted into the conduit. As a result, the new or the existing cable may be easily damaged due to that friction. Such is particularly true when the cable in the conduit is ungulating which causes the cable being introduced to take a sinuous, fraction-laden path.

One solution to this problem is to position one or more high density polypropylene tubes, often known as innerducts, in the conduit to divide it into a number of compartments into which a cable can be inserted. The purpose of these innerducts is to assure that one cable does not rub against another cable while being inserted into, or while coexisting in, a conduit. However, it is not easy to insert a cable into these innerducts because of the friction afforded by the cable jacket against the walls of the innerduct. Moreover, the innerducts are provided at the installation site on a reel, and because they have reel memory when positioned in a conduit, it is even more difficult to install a cable in these innerducts as they spiral through a conduit. Also, because they spiral through a conduit, most often several of these rigid innerducts must be installed during the initial installation of the conduit even though they may not be needed for several years, if at all. Thus, the user must prepay for the innerducts and their installation which could be wasted money.

An extremely successful solution to this problem is a fabric innerduct sold under the trademark MAXCELL® by the TVC Communications Division of WESCO Distribution, Inc. and shown in U.S. Pat. No. 6,262,371 which is incorporated by reference for whatever details may be necessary to understand the present invention. This innerduct is first positioned in a conduit and divides the conduit into longitudinally extending compartments. When a cable is positioned in one of the compartments, a pull tape or rope that is in another compartment is utilized to pull a second cable into that compartment. Because there is fabric between the cables, the friction is not on the cable jacket but on the fabric which makes installation easier.

However, a problem can exist when using these innerducts in small diameter conduits which extend long distances. In these small conduits, the fabric innerduct takes up much of the space in the conduit and the tape or rope may tend in lock up in the innerduct thereby impeding the ability to pull in a cable.

As a result, the need exists to eliminate the need for any form of innerduct in a conduit.

DISCLOSURE OF THE INVENTION

It is thus an object of one aspect of the present invention to provide a conduit divider in the form of a cable with a pliant sleeve.

It is an object of another aspect of the present invention to provide a conduit divider which is easy to insert into a conduit.

It is an object of an additional aspect of the present invention to provide a method of dividing a conduit by inserting a cable with a pliant sleeve into the conduit.

It is an object of a further aspect of the present invention to eliminate the need and cost of pre-dividing a conduit with innerducts.

It is an object of a still further aspect of the present invention to avoid having to install multiple innerducts in a conduit some of which may never be used.

It is an object of yet another aspect of the present invention to eliminate the need to pull a cable into an innerduct thereby reducing construction cost and time.

These and other objects of the present invention, as well as the advantages thereof over existing prior art forms, which will become apparent from the description to follow, are accomplished by the improvements hereinafter described and claimed.

In general, an apparatus according to the present which, when inserted into a conduit, divides the conduit so that a cable may be inserted therein includes a cable and a pliant sleeve attached to the cable.

In accordance with one method of the present invention, a cable in the conduit is separated from the conduit by wrapping a pliant material around the cable and thereafter inserting the wrapped cable into the conduit.

Another method of the present invention involves the use of a cable to divide a conduit so that a second cable inserted into the conduit does not engage a first cable already in the conduit. The method includes the step of attaching a pliant sleeve to the first cable prior to its insertion into the conduit.

Another method of the present invention involves the insertion of a cable into a conduit which does not have a conduit dividing innerduct therein including the step of simultaneously inserting the conduit divider and the cable into the conduit.

The present invention also contemplates use of a cable to divide a conduit by attaching a pliant sleeve to the cable and inserting the cable with the sleeve attached thereto into the conduit.

Preferred exemplary conduit dividing cable and sleeve assemblies according to the concepts of the present invention are shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 4:
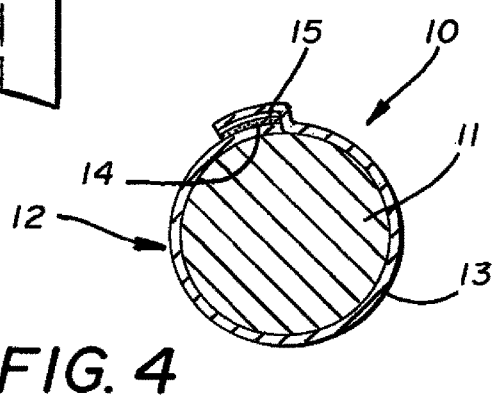
FIG. 4 is a sectional view of a cable and sleeve of the present invention showing the sleeve of FIGS. 2 and 3 wrapped around the cable.

One form of a cable and sleeve assembly made in accordance with the present invention is indicated generally by the numeral 10 and includes a communications cable 11 and a sleeve generally indicated by the numeral 12. Cable 11 is a conventional item and, as such, typically includes a plurality of conductive wires encapsulated within a plastic jacket. Sleeve 12 may be made of a pliant material such as the fabric described in U.S. Pat. No. 6,421,485, and can be in the form of a longitudinally extending sheet 13 of material having a fastening system formed on opposed edges thereof. Such a system could be glue or some other adhesive, or it could be the VELCRO® hook and loop fastening system shown. Thus, one edge on one side of sheet 13 may be provided with a hook connector 14 and the opposed edge on the other side of sheet 13 may be provided with the companion loop connector 15. The width of the sheet between the connectors 14 and 15 generally corresponds to the circumference of cable 11 such that when sleeve 12 is positioned on cable 11, as shown in FIG. 4, connectors 14 and 15 may engage each other to tightly hold sleeve 12 on cable 11.

Figure 7:
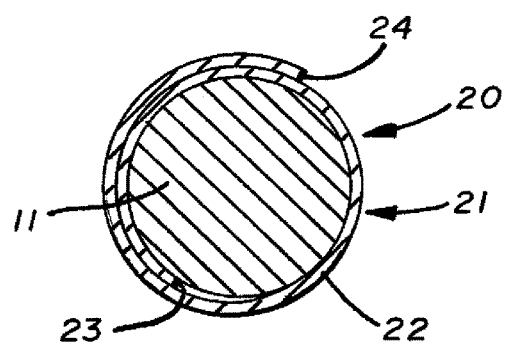
FIG. 7 is a sectional view of a cable and sleeve of the present invention showing the sleeve of FIGS. 5 and 6 wrapped around the cable.

An alternative cable and sleeve assembly is shown in FIG. 7 and generally indicated by the numeral 20. There, the conventional cable 11 is shown as receiving a spring-loaded sleeve of fabric or thin plastic material generally indicated by the numeral 21 which is formed of a sheet 22 having opposed edges 23 and 24. As shown, edge 24 circumferentially overlaps a portion of sheet 22 to provide a tight grip on cable 11.

Figure 8:
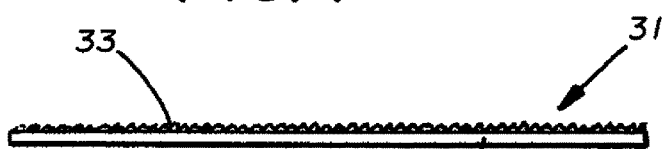
FIG. 8 is an end view of another alternative version of a fabric sleeve made in accordance with the present invention.
Figure 9:
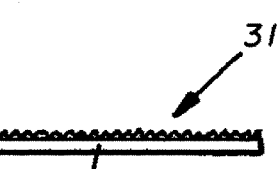
FIG. 9 is a sectional view of a cable and a sleeve of FIG. 8 wrapped around the cable.

Another alternative cable and sleeve assembly is shown in FIG. 9 and generally indicated by the numeral 30. There, the conventional cable 11 is shown as receiving a fabric sleeve generally indicated by the numeral 31. Like sleeve 12, sleeve 31 may be formed of a pliant or fabric material and provided in the form of a longitudinally extending sheet 32. As best shown in FIG. 8, one side of sheet 32 can be provided with an adhesive 33. The width of sheet 32 generally corresponds to the circumference of cable 11 such that when sheet 32 is placed on cable 11 with its adhesive 33 side facing the plastic jacket of cable 11, sheet 32 firmly engages the plastic jacket of cable 11 as shown in FIG. 9.

The cable sleeve assemblies 10, 20, or 30 may be manufactured and assembled at the factory and shipped on rolls to the underground conduit construction site. Typically, such rolls could have two thousand or more feet of assemblies 10, 20, or 30 thereon to be played out and inserted into an underground conduit by conventional systems.

Figure 1:
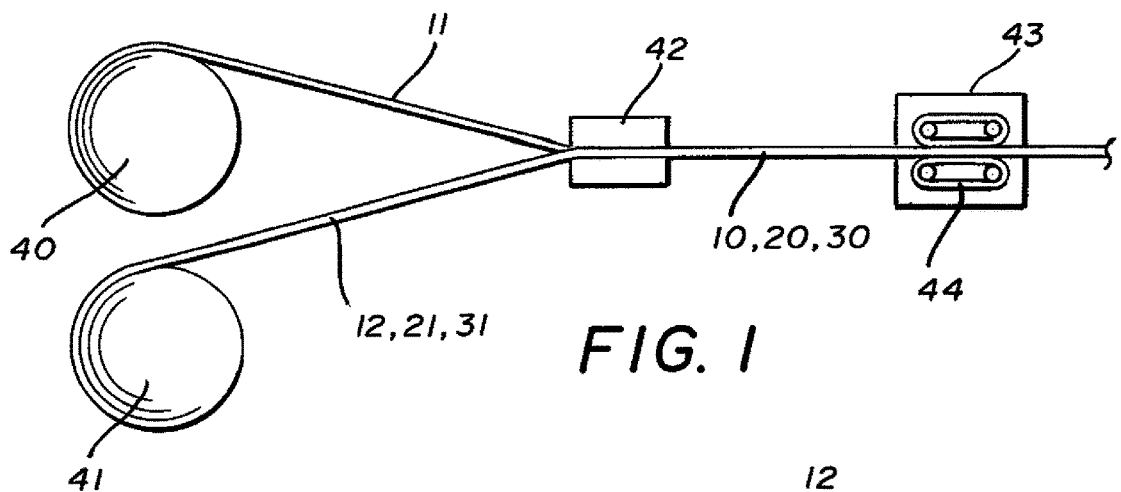
FIG. 1 is a schematic view showing the manner in which a conventional cable is wrapped with a fabric sleeve and inserted in to conduit.
Figure 2:
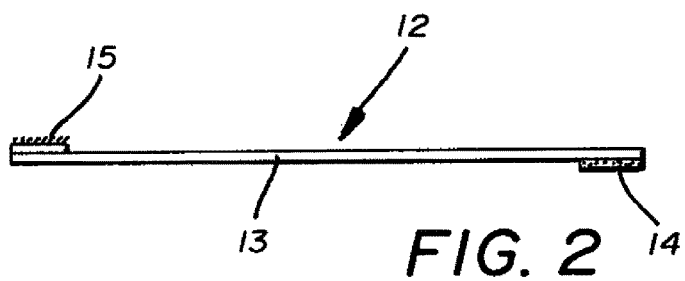
FIG. 2 is an end view of a fabric sleeve made in accordance with the present invention.
Figure 3:
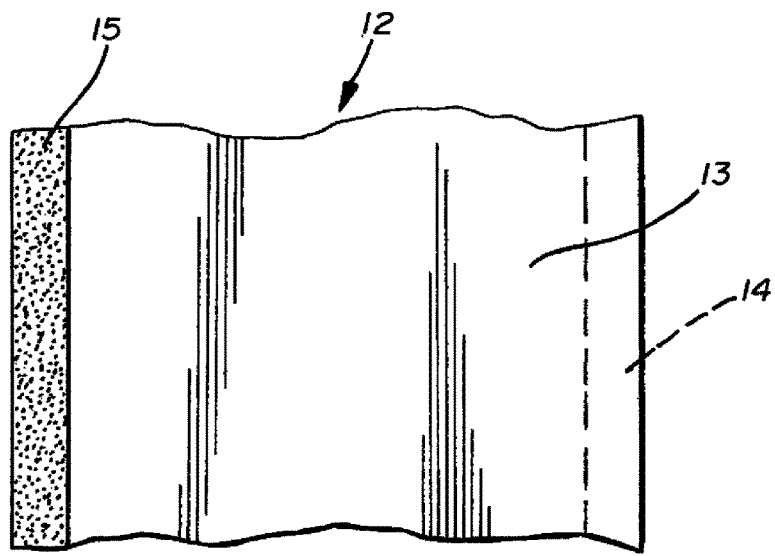
FIG. 3 is a fragmentary top plan view of the sleeve of FIG. 2.
Figure 5:
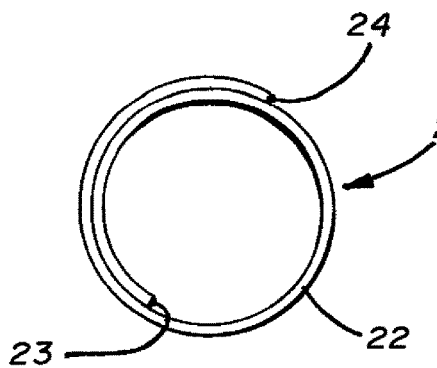
FIG. 5 is an end view of an alternative version of a fabric sleeve made in accordance with the present invention.
Figure 6:
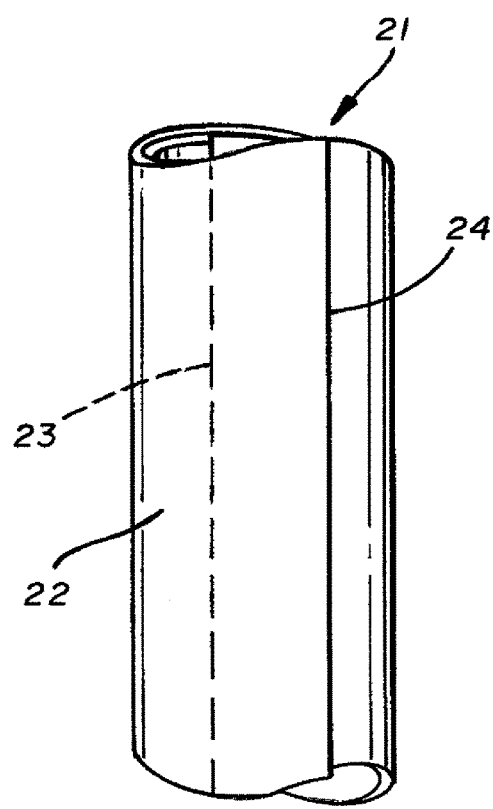
FIG. 6 is a fragmentary top plan view of the sleeve of FIG. 5.

Alternatively, a sleeve 12 or 21 could be applied to the cable 11 in the field as schematically shown in FIG. 1. In this instance, a roll 40 of cable 11 and a roll 41 of a sleeve 12 or 21 are provided at the site for installation into a conduit. The cable 11 and sleeve 12 in the condition shown in FIG. 2, 3 or 8 or the sleeve 21 in the condition shown in FIGS. 5 and 6, are fed to a device 43. In the instance of operation with a sleeve 12 or 31, device 43 is a folder which wraps sleeve 12 or 31 around cable 11 as they simultaneously pass through device 42 to form assembly 10. In the instance of operation with a sleeve 21, device 42 can be a spreader which opens sleeve 21 so that the cable 11 may pass between edges 23 and 24. The spreader then releases sleeve 21 to allow sleeve 21 to snap back to its original condition and now forming assembly 20. The resulting cable and sleeve assembly 10, 20 or 30 may then be pulled into a conduit by a conventional rope or pull tape or may be provided to a conventional cable pushing/blowing machine 43 which includes tractor-like devices 44 to grip assembly 10 or 20 and push it into and through a conduit (not shown) to the right in FIG. 1. The pushing movement of devices 44 can be assisted by the blowing of air into the conduit as is known in the art.

Figure 10:
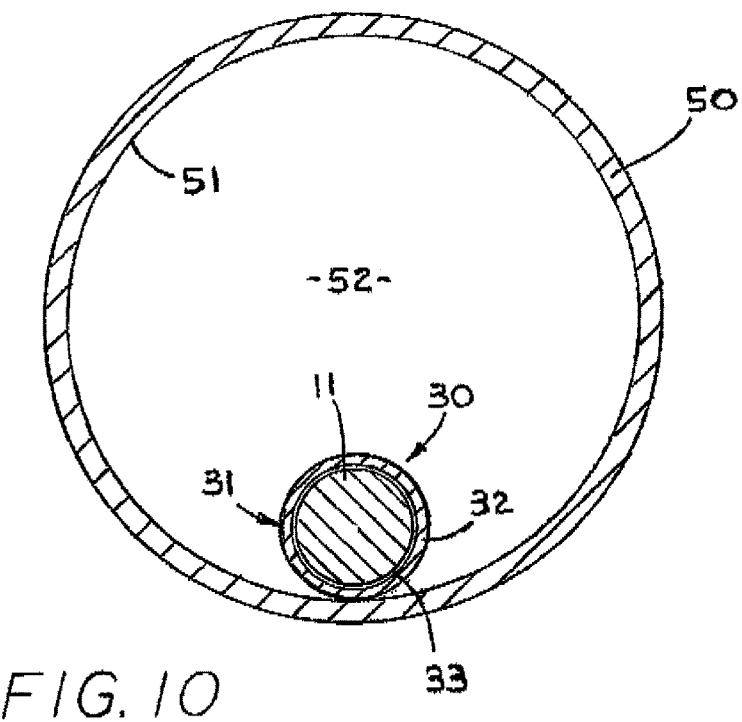
FIG. 10 is a sectional end view of a conduit having the sleeved cable of FIG. 9 in it to divide the conduit forming a space for additional cables.
Figure 11:
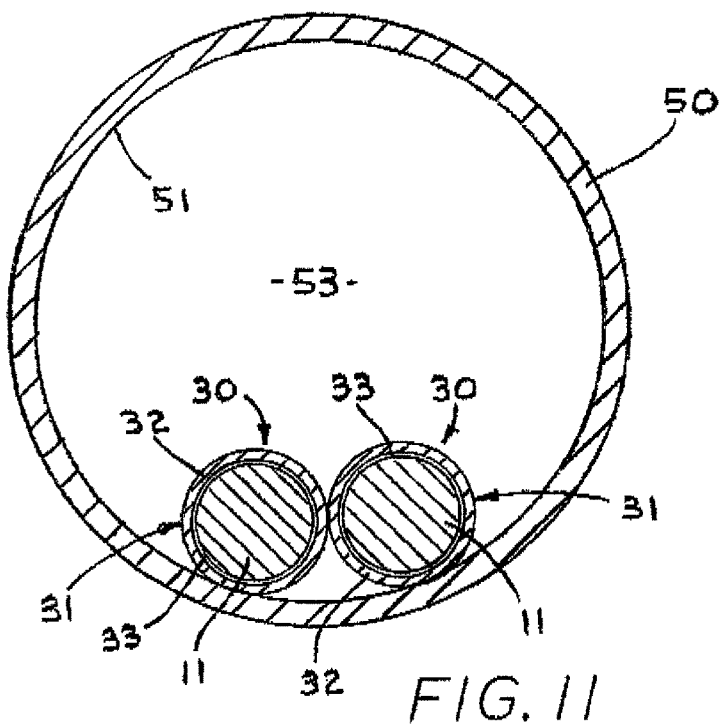
FIG. 11 is a view similar to FIG. 10 but showing a second sleeved cable in the open space formed by the first cable and further dividing the conduit to form a second space.

By wrapping a cable with a pliable material which has a coefficient of friction less than the jacket of a cable and less than the conduit, assemblies 10, 20 or 30 can be more easily installed into a conduit. If the conduit has an innerduct positioned therein, the cable sleeve assemblies 10, 20 or 30 are also more easily inserted into a compartment of the innerduct. However, assemblies 10, 20 or 30 actually eliminate the need for any innerduct thus saving the cost of thereof. This is because the cable sleeve assemblies themselves act as a conduit divider. A conduit 50 having an interior surface 51 is shown as having a cable sleeve assembly 30 therein in FIG. 10. As cable sleeve assembly 30 was inserted into conduit 50, sleeve 31 effectively divides or separates the cable 11 from the interior surface 51 of conduit 50. Conduit 50 is thus provided with a space 52 into which one or more cables may be positioned. As shown in FIG. 11, a second cable sleeve assembly 30 has been inserted into the space 52 to further form another space 53 therein. Thus, the cable sleeve assemblies eliminate the need to utilizing any type of innerduct to pre-divide a conduit prior to the installation of a cable. Moreover, the step of pulling a cable into a duct divider is eliminated thereby reducing construction cost and time.

As a result, a cable sleeve assembly 10, 20 or 30 manufactured and used as described herein accomplishes the objects of the invention and otherwise substantially improves the art.

What is claimed is:

1. A method of using a second cable to divide a longitudinally extending underground conduit already having a first cable in it comprising the steps of attaching a pliant material having a coefficient of friction less than that of the first cable substantially around the entire length of the second cable by applying a bonding mechanism to substantially the entire length of the pliant material so that the pliant material is firmly connected to the second cable along substantially the entire length of the second cable, and thereafter inserting the second cable with the pliant material attached thereto into the conduit by longitudinally moving the second cable into the conduit, the pliant material remaining attached to the second cable when the cable is in use.

2. The method of claim 1 wherein the bonding mechanism is an adhesive.

3. A method of using a first cable to divide a longitudinally extending conduit already positioned underground so that a second cable to be moved longitudinally into the conduit does not engage the first cable already in the underground conduit comprising the step of attaching a pliant sleeve having a coefficient of friction less than that of the first cable to the first cable by applying a bonding mechanism to substantially the entire length of the sleeve prior to longitudinally moving the first cable into the underground conduit such that the pliant sleeve is at all times firmly connected to the first cable.

4. The method of claim 3 wherein the step of attaching includes the step of using an adhesive to attach the sleeve to the first cable.

5. The method of claim 3 further comprising the step of attaching a pliant sleeve to the second cable so that a third cable inserted into the conduit does not engage the first and second cables.

6. Use of a cable to divide a longitudinally extending underground conduit by attaching a pliant sleeve having a coefficient of friction less than that of the cable to substantially the entire length of the cable by applying a bonding mechanism to substantially the entire length of the sleeve and longitudinally moving the cable with the sleeve attached thereto into the conduit such that the pliant sleeve is and remains firmly connected to the cable when the cable is in use.

7. A method of inserting a cable into a longitudinally extending underground conduit which does not have a conduit dividing innerduct therein comprising the step of simultaneously longitudinally moving the cable into the conduit with a conduit divider having a coefficient of friction less than that of the cable being at all times firmly attached by a bonding mechanism applied to substantially the entire length of the cable, the divider remaining attached to the cable when the cable is fully inserted into the conduit when in use.

8. A method of claim 7 wherein the moving step is accomplished by first attaching a pliant material to the cable and thereafter moving the cable into the conduit.

9. A method of dividing a conduit to isolate any cables positioned therein from each other comprising the steps of inserting at least two cables having pliant sleeves attached thereto into the conduit, and thereafter inserting another cable into the conduit isolated from the at least two cables by the pliant sleeves.

* * * * *